US011470549B2

(12) United States Patent
Mehta et al.

(10) Patent No.: US 11,470,549 B2
(45) Date of Patent: Oct. 11, 2022

(54) METHOD AND SYSTEM FOR IMPLEMENTING MINI-SLOT SCHEDULING FOR ALL UES THAT ONLY ARE ENABLED TO LOWER POWER USAGE

(71) Applicant: DISH Wireless L.L.C., Englewood, CO (US)

(72) Inventors: Dhaval Mehta, Englewood, CO (US); Amit Pathania, Englewood, CO (US)

(73) Assignee: DISH Wireless L.L.C., Englewood, CO (US)

(*) Notice: Subject to any disclaimer, the term of this patent is extended or adjusted under 35 U.S.C. 154(b) by 70 days.

(21) Appl. No.: 16/945,196

(22) Filed: Jul. 31, 2020

(65) Prior Publication Data

US 2022/0039007 A1     Feb. 3, 2022

(51) Int. Cl.
*H04W 52/02*    (2009.01)
*H04W 72/04*    (2009.01)
*H04W 72/12*    (2009.01)

(52) U.S. Cl.
CPC ... *H04W 52/0209* (2013.01); *H04W 72/0446* (2013.01); *H04W 72/12* (2013.01); *H04W 72/1289* (2013.01)

(58) Field of Classification Search
None
See application file for complete search history.

(56) References Cited

U.S. PATENT DOCUMENTS

| | | | |
|---|---|---|---|
| 7,164,667 B2 | 1/2007 | Rayment et al. | |
| 10,470,120 B2 | 11/2019 | Fischer | |
| 10,523,914 B1 | 12/2019 | Phillips et al. | |
| 10,868,471 B2 | 12/2020 | Fischer | |
| 2006/0182262 A1 | 8/2006 | Goldman et al. | |

(Continued)

FOREIGN PATENT DOCUMENTS

| | | |
|---|---|---|
| WO | 2020017941 A1 | 12/2014 |
| WO | 2019210946 A1 | 11/2019 |

OTHER PUBLICATIONS

5G Americas, "New services & applications with 5G ultra-reliable low latency communications", Nov. 2018. (Year: 2018).*

(Continued)

*Primary Examiner* — Faruk Hamza
*Assistant Examiner* — Cassandra L Decker
(74) *Attorney, Agent, or Firm* — KW Law, LLP

(57) ABSTRACT

Systems and methods are provided for adaptive mini-slot management in a network, including an element management control unit comprising a set of distribution and central units (DU/CU) to monitor power and channel traffic at a plurality of cell sites in the network; a scheduler unit for user equipment (UE) to enable and disable a set of mini-slots in a downlink (DL) pattern and an uplink (UL) pattern including at least two concatenated patterns jointly repeated with periodicity in a slot configuration period for new radio (NR) communications by users at cell sites in the network; and in response to a request by a user, the scheduler unit reserves a number of mini-slots for use in each slot configuration period wherein a reserved slot number is responsive to at least one of a condition of an AC power outage, and reduced channel traffic based on data received by the DU/CU about the condition.

20 Claims, 6 Drawing Sheets

(56) References Cited

U.S. PATENT DOCUMENTS

| | | |
|---|---|---|
| 2008/0247760 A1 | 10/2008 | Edmon et al. |
| 2010/0009694 A1 | 1/2010 | Fischer |
| 2011/0034196 A1 | 2/2011 | Jonishi et al. |
| 2013/0094451 A1 | 4/2013 | Pavlovski et al. |
| 2013/0169042 A1 | 7/2013 | Melamed |
| 2014/0128073 A1 | 5/2014 | Farhadi |
| 2014/0293777 A1 | 10/2014 | Dhillon et al. |
| 2014/0357259 A1 | 12/2014 | Tomeczko et al. |
| 2015/0023163 A1 | 1/2015 | Gonzalez et al. |
| 2015/0172115 A1 | 6/2015 | Nguyen et al. |
| 2017/0054595 A1 | 2/2017 | Zhang et al. |
| 2017/0078209 A1 | 3/2017 | Miklos |
| 2017/0201968 A1 | 7/2017 | Nam et al. |
| 2017/0367022 A1 | 12/2017 | Chandrasekaran |
| 2018/0206267 A1* | 7/2018 | Islam ............... H04L 5/0091 |
| 2018/0324816 A1* | 11/2018 | Islam ............... H04W 72/048 |
| 2019/0037409 A1 | 1/2019 | Wang et al. |
| 2019/0053193 A1 | 2/2019 | Park et al. |
| 2019/0082326 A1 | 3/2019 | Mathison et al. |
| 2019/0089716 A1 | 3/2019 | Stocker |
| 2019/0132857 A1* | 5/2019 | Babaei ............... H04W 72/042 |
| 2019/0140904 A1 | 5/2019 | Huang et al. |
| 2019/0182716 A1 | 6/2019 | Futaki et al. |
| 2019/0182752 A1 | 6/2019 | Lou et al. |
| 2019/0223055 A1 | 7/2019 | Bor Yaliniz et al. |
| 2019/0223093 A1 | 7/2019 | Watfa et al. |
| 2019/0246420 A1 | 8/2019 | Park et al. |
| 2019/0253230 A1 | 8/2019 | Loehr et al. |
| 2019/0357224 A1* | 11/2019 | Li ............... H04W 72/082 |
| 2019/0357260 A1 | 11/2019 | Cirik et al. |
| 2019/0364492 A1 | 11/2019 | Azizi et al. |
| 2020/0059345 A1 | 2/2020 | Pelletier et al. |
| 2020/0084107 A1 | 3/2020 | Li |
| 2020/0169921 A1 | 5/2020 | Zhu et al. |
| 2020/0170022 A1* | 5/2020 | Jones ............... H04W 4/06 |
| 2020/0221346 A1 | 7/2020 | Park et al. |
| 2020/0229076 A1 | 7/2020 | Jin et al. |
| 2020/0245233 A1 | 7/2020 | Qian et al. |
| 2020/0304406 A1 | 9/2020 | Thubert et al. |
| 2020/0344641 A1 | 10/2020 | Veggalam et al. |
| 2020/0344695 A1 | 10/2020 | Wang et al. |
| 2020/0382386 A1 | 12/2020 | Narendra et al. |
| 2021/0037390 A1 | 2/2021 | Tofighbakhsh et al. |
| 2021/0058473 A1 | 2/2021 | Yerli |
| 2021/0067421 A1 | 3/2021 | Kidd et al. |
| 2021/0068044 A1 | 3/2021 | Chan et al. |
| 2021/0112565 A1 | 4/2021 | Bhaskaran et al. |
| 2021/0136680 A1 | 5/2021 | Browne et al. |
| 2021/0167930 A1 | 6/2021 | Jeon et al. |
| 2021/0203468 A1 | 7/2021 | Yi et al. |
| 2021/0219185 A1 | 7/2021 | Xin et al. |
| 2021/0219222 A1 | 7/2021 | Jia et al. |
| 2021/0235492 A1 | 7/2021 | Iyer et al. |
| 2021/0243232 A1 | 8/2021 | Verma et al. |
| 2021/0243673 A1 | 8/2021 | Miller et al. |
| 2021/0243684 A1 | 8/2021 | Wang et al. |
| 2021/0266831 A1* | 8/2021 | Zhou ............... H04W 72/14 |
| 2021/0314983 A1* | 10/2021 | Karaki ............... H04L 5/0094 |
| 2021/0329666 A1* | 10/2021 | Ljung ............... H04L 5/001 |

OTHER PUBLICATIONS

ISA-USPTO, International Search Report issued in IA No. PCT/US2021/035616, dated Aug. 30, 2021.

Park, J.H. et al. "A New Traffic Load based Cell Zooming Algorithm in Dense Small Cell Environments", IEEE, 2015, pp. 332-337.

ISA-USPTO, International Search Report issued in IA. No. PCT/US2021/039580 dated Jan. 10, 2022.

* cited by examiner

METHOD AND SYSTEM FOR IMPLEMENTING MINI-SLOT SCHEDULING FOR ALL UES THAT ONLY ARE ENABLED TO LOWER POWER USAGE

CROSS-REFERENCE TO RELATED APPLICATION

This application is related to U.S. Patent Application with Ser. No. 16/891,991, entitled METHOD AND SYSTEM FOR SLICING ASSIGNING FOR LOAD SHEDDING TO MINIMIZE POWER CONSUMPTION WHERE GNB IS CONTROLLED FOR SLICE ASSIGNMENTS FOR ENTERPRISE USERS filed on Jun. 3, 2020, and is related to the U.S. Patent Application with Ser. No. 16/891,934, entitled METHOD AND SYSTEM FOR SMART OPERATING BANDWIDTH ADAPTATION DURING AC POWER OUTAGES filed on Jun. 3, 2020. The content of both applications is incorporated by reference in their entirety.

TECHNICAL FIELD

The following discussion generally relates to power management in wireless communications systems. More particularly, the following discussion relates to systems, devices, and automated processes that reduce power drawn by radio frequency (RF) radios based on commercial power interrupts or failures in 5G data networks or the like by smart bandwidth adaptation and traffic loading increasing the operating time of the switched backup uninterruptible power supply (UPS).

BACKGROUND

The 5G data standard and telephone networks were developed to provide greatly improved bandwidth and quality of service to mobile telephones, computers, internet-of-things (IoT) devices, and the like. The high-bandwidth 5G networks, however, face additional challenges that are now being recognized. In part, because of the high-bandwidth, the 5G base station is expected to consume roughly three times as much power as the legacy 4G base stations in use. Further, more 5G base stations are needed to cover the same area as the legacy 4G base stations. Hence, not only does each 5G base consume three times the power of the 4G base station, for coverage of the same area more 5G base stations are in use, and as a result, significant increases in power consumption will result.

Further, along with the increases in power usage, in the case of AC power outages, the 5G base stations are required to have a battery backup to ensure service offerings during AC power outages. These battery backup units are expensive, and the cost for the battery backup is in part determined by the amount of the power needed and subsequently consumed by the RF radio transmitters and receivers at the 5G base station; which in this case exceeds the legacy 4G base stations by both number in use and the power need for each 5G base station. In these cases in which significant amounts of power are needed and consumed by certain 5G base stations, there is needed several serially or parallelly connected backup power packs that result in multiple fold cost increases in the eventual configured 5G base stations for each cell site.

Slot is typical unit for transmission used by scheduling mechanism. New Radio allows transmission to start at any OFDM symbol and to last only as many symbols as required for communication. This is known as "mini-slot" transmission. This facilitates very low latency for critical data communication as well as minimizes interference to other RF links. Mini-slot helps to achieve lower latency in 5G new radio architecture.

Therefore it is desired to provide a solution to implement a scheduler to reduce enabled slots (i.e., uplink or downlink), for example, implementing mini-slots that do not require all 14 symbols in a slot configuration for scheduling to manage power consumption without causing any cell site interruptions in service. Also, it is desirable to change the frequency in a time domain for scheduling as well the enabled/not enabled slots. The scheduler can implement scheduling based on the time domain, and the mini-slots are enabled or disabled to reduce the power requirements of all the operating carriers of cell sites in a network, particularly in case of an AC power outage or interruption for enhanced power management efficiencies of each cell site.

It is, therefore, desirable to create systems, devices, and automated processes that can monitor commercial power interrupts and failures and allow different configurations of base station components to operate in the desired cell network. It is also desirable to improve connectivity and to the operating time for base station equipment operating in backup power modes using backup batteries at cell sites within 5G or similar networks.

Furthermore, other desirable features and characteristics of the present invention will become apparent from the subsequent detailed description and the appended claims, taken in conjunction with the accompanying drawings and the foregoing technical field and background.

DESCRIPTION OF THE DRAWINGS

The exemplary embodiments will hereinafter be described in conjunction with the following drawing figures, wherein like numerals denote like elements, and wherein.

BRIEF SUMMARY

Figure 1:
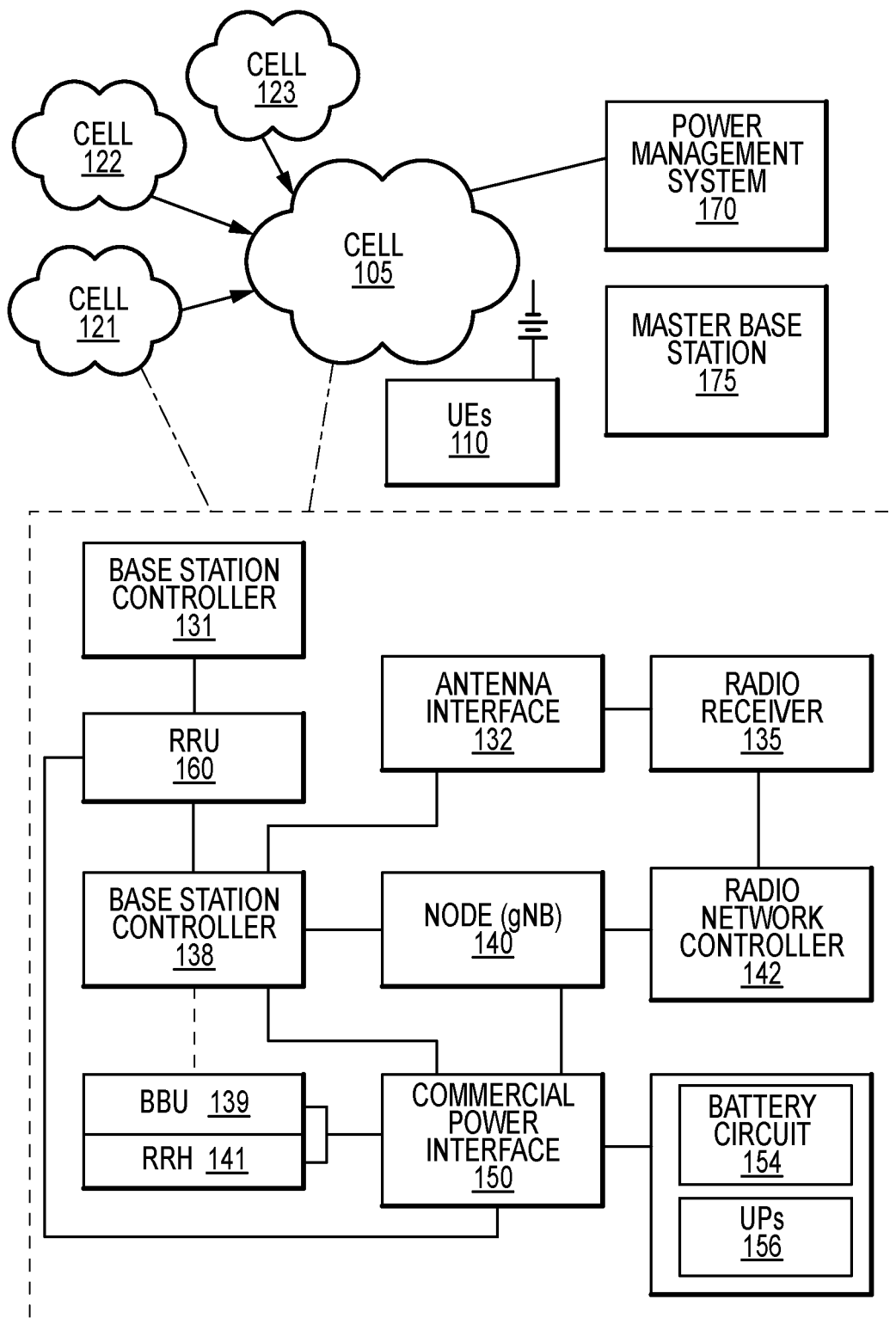
FIG. 1 illustrates an exemplary diagram of components in a mini-slot scheduling and b power management system in a wireless data networking environment in accordance with various embodiments.

Systems, devices, and automated processes are provided to provide mini-slot patterns to reduce the power draw of a backup power supply to a cell site in response to a power loss or lack of channel congestion at a cell site.

In an exemplary embodiment, a system for adaptive mini-slot management in a network is provided. The system includes an element management control unit including a set of distribution and central units (DU/CU) to monitor power and channel traffic at a plurality of cell sites in the network; a scheduler unit for user equipment (UE) to enable and disable a set of mini-slots in a downlink (DL) pattern and an uplink (UL) pattern including at least two concatenated patterns jointly repeated with periodicity in a slot configuration period for new radio (NR) communications by users at cell sites in the network; and in response to a request by a user, the scheduler unit reserves a number of mini-slots for use in each slot configuration period wherein a reserved slot number is responsive to at least one of a condition of an AC power outage, and reduced channel traffic based on data received by the DU/CU about the condition.

In various exemplary embodiments, the system further includes the scheduler unit configured to initialize a set of mini-slots for use when scheduling the UE with by mini-slot assignments to dynamically inform the UE about a UL transmit and DL receive patterns for each mini-slot configuration period wherein an initial set of mini-slots are enabled in response to data received about a loss of power, and reduced channel traffic at mini-slots from the DU/CU monitoring cell sites of the network. The system further includes the scheduler unit to implement a time-domain based schedule to reduce power consumption in the UL and DL transmissions by reductions in slot time via changing a frequency of the mini-slot configuration period by applying a set of time-domain scheduling periods wherein a select number of mini-slots are enabled in each time-domain scheduling period. The system further includes the scheduler unit configured to use a certain number of OFDM symbols to enable a dynamic set of mini-slots to send and receive data requests in scheduled operations. The system further includes the scheduler unit to allocate OFDM symbols to enable and disable a certain number of mini-slots in the slot configuration period to deliver channel traffic, when a mini-slot allocation over a large bandwidth is deemed by the scheduler unit is unnecessary due to decreases in amounts of data transmitted that results and is indicative of less active mini-slots required at a cell site. The mini-slot length for a mini-slot configuration period of UL and DL transmissions includes 2, 4, and 8 OFDM symbols. The system further includes the scheduler unit configured to support low latency and reduced power consumption for each mini-slot transmission by enabling UL and DL transmissions over variable periods for each mini-slot based on a set of frequencies wherein a mini-slot is a fraction of a slot. The system further includes in response to the DL transmission, and the scheduler unit is configured to not enable mini-slots to receive DL data transmissions outside an active bandwidth part. The system further includes in response to ongoing slot transmissions, and the scheduling unit configured to preempt an already ongoing slot-based transmission for other UEs to enable immediate transmission of data at low latency to decrease amounts of power drawn. The system further includes in response to UL transmission, and the scheduler unit is configured to not enable mini-slots to receive DL data transmissions outside an active bandwidth part.

In another exemplary embodiment, a method for adaptive mini-slot management is provided. The method includes configuring an element management control unit including a set of distribution (DU) and central units (DU/CU) for monitoring power and channel traffic at a plurality of cell sites in a network; configuring by a scheduler unit to enable and disable a set of mini-slots in a downlink (DL) pattern and an uplink (UL) pattern for adaptive mini-slot allocation including at least two concatenated patterns jointly repeated with periodicity for new radio (NR) communications by users at cell sites in the network; and in response to a request by a user, reserving by the scheduler unit a number of mini-slots for use in each slot configuration period wherein a reserved slot number is responsive to at least one of a condition of an AC power outage, and reduced channel traffic based on data received by the DU/CU about the condition.

In various exemplary embodiments, the method further includes initializing by the scheduler unit a set of mini-slots for use when scheduling for User Equipment (UE) by mini-slot assignments to dynamically inform the UE about an UL transmit and DL receive mini-slot patterns for each mini-slot configuration period wherein an initial set of mini-slots are enabled in response to data received about a loss of power, and reduced channel traffic at mini-slots from the DU/CU monitoring cell sites of the network.

The method further includes implementing, by the scheduler unit, a time-domain scheduling to reduce power consumption in UL and DL transmissions by reducing mini-slot time via changing a frequency of the mini-slot configuration period by applying a set of time-domain scheduling periods wherein a select number of mini-slots are enabled in each time-domain scheduling period. The method further includes: using by the scheduler unit, a certain number of Orthogonal frequency-division multiplexing (OFDM) symbols for enabling mini-slots when implementing send and receive data requests in scheduling operations.

The method further includes: allocating, by OFDM symbols by the scheduler unit, to enable and disable mini-slots in a slot configuration period to deliver channel traffic when a mini-slot allocation over a large bandwidth is deemed unnecessary due to decreased amounts of data transmission indicative of less active mini-slots required at a cell site. The method mini-slot length for a mini-slot configuration period of UL and DL transmissions includes 2, 4, and 8 OFDM symbols. The method further includes supporting, by the scheduler unit, low latency and reduced power consumption for each slot transmission by enabling UL and DL transmissions over variable periods for each mini-slot based on a set of frequencies wherein a mini-slot is a fraction of a slot.

The method further includes in response to a DL transmission, preventing by the scheduler unit enabling of at least one mini-slots to receive DL transmissions outside an active bandwidth part; and in response to a UL transmission, preventing by the scheduler unit, enabling of at least one mini-slot to receive UL transmissions outside the active bandwidth part. The method further includes in response to ongoing slot transmissions, preempted by the scheduler unit, already ongoing slot-based transmission for other UEs to enable immediate transmission of data at low latency to decrease amounts of power drawn at the cell site.

In yet another exemplary embodiment, a computer program product tangibly embodied in a computer-readable storage device that stores a set of instructions that when executed by a processor perform a method for an operational mode of a base station when a power loss or light network load is detected, the method including: configuring an element management control unit including a set of distribution (DU) and central units (DU/CU) for monitoring power and channel traffic at a plurality of cell sites in a network; configuring by a scheduler unit to enable and disable a set of mini-slots in a downlink (DL) pattern and an uplink (UL)

pattern for adaptive mini-slot allocation including at least two concatenated patterns jointly repeated with periodicity for new radio (NR) communications by users at cell sites in the network; and in response to a request by a user, reserving by the scheduler unit a number of mini-slots for use in each slot configuration period wherein a reserved slot number is responsive to at least one of a condition of an AC power outage, and reduced channel traffic based on data received by the DU/CU about the condition.

DETAILED DESCRIPTION

The following detailed description is intended to provide several examples that will illustrate the broader concepts that are set forth herein, but it is not intended to limit the invention or the application and uses of the invention. Furthermore, there is no intention to be bound by any theory presented in the preceding background or the following detailed description.

When connecting a 5G base station to the power grid, this does not always guarantee that power is available and provided to the 5G base continuously all the time without interruption because of a plethora of environmental and operating reasons such as accidents, lightning strikes, rolling blackouts, etc. Therefore, for a robust and reliable 5G service made available from a 5G base station, carriers have to build in a backup power system. It is the norm to provide backup power to the macrocells in a 5G network, and often the macro level has sufficient service. However, the power-consuming small cell structure requires added power backup that is not usually available in legacy 4G cell tower power deployments. Hence, added backup power is essential to enable the proper functioning of the small cell rollout.

In 5G networks, the RF radio units are required to have a battery backup to ensure service offerings during an AC power outage. The battery backup units are expensive, and the cost for each battery backup is calculated by the power consumed by the radio unit, the backup duration, and how many operating carriers are at a base station or network.

Currently, there are a number of obstacles or drawbacks that prevent optimization of battery backup capacity when a power interrupt or outage occurs. It is a desire that the required battery backup capacity can be optimized as follows:

(1) Shut down Operating carriers: this is not a preferred option, as this impacts the user experience, lack of emergency calls, such as E911, resulting in users canceling their service and switching to operators who have battery backup services; (2) Reduce the operating carrier Bandwidth: this is not easily feasible in current operations as changing the operating carrier BW requires a new cell configuration on the same radio with lower channel BW, and (3) this will also cause service interruption as changing the operating BW will cause the site to restart for the new channel BW to be in effect.

The advanced capabilities of 5G small cells mean added power requirements. Increased data traffic requires more computational power. Although massive MIMO can help improve spectral efficiency, power efficiency is generally lower, and a typical three-sector small cell can require 200-1,000 watts of power.

There is a need to receive power by a large number of small cells in a cost-effective and repeatable way that supports fast and efficient rollouts. The first step involves recognizing that the traditional model for powering macro cell sites does not apply to small cells.

A-frame has a duration of 10 ms, which consists of 10 subframes having 1 ms duration each similar to LTE technology. Each subframe can have $2\mu$ slots. Each slot consists of 14 Orthogonal frequency-division multiplexings (OFDM) symbols. The radio frame of 10 ms is transmitted continuously as per TDD topology one after the other. The subframe is of fixed duration (i.e., 1 ms), whereas slot length varies based on subcarrier spacing and number of slots per subframe. Each slot occupies either 14 OFDM symbols or 12 OFDM symbols based on normal Cyclic Prefix (CP) and extended CP, respectively.

A mini-slot is a minimum scheduling unit used in 5G NR. It occupies 2, 4, or 7 OFDM symbols (regardless of numerology), so a user can be allocated a mini-slot, which is less than the slot (14 symbols), and it is suitable for low latency communication. It enables what is called non-slot based scheduling that will have higher priority than normal Enhanced Mobile Broadband (eMBB) user, so it can pre-empt other eMBB transmissions as it has requirements for lower latency.

A slot can be classified as downlink (all symbols are dedicated for downlink) or uplink (all symbols are dedicated for uplink) or mixed uplink and downlink transmissions. In the case of Frequency Division Duplex (FDD), all symbols within a slot for a downlink carrier are used for downlink transmissions and all symbols within a slot for an uplink carrier are used for uplink transmissions. New Radio (NR) Time Division Duplex (TDD) uses a flexible slot configuration. The OFDM symbols in a slot can be classified as 'downlink,' 'flexible,' or 'uplink.' Flexible symbols can be configured either for uplink or for downlink transmissions. NR TDD uses a flexible slot configuration. OFDM symbols in a slot can be classified as 'downlink', 'flexible', or 'uplink'. The flexible symbol can be configured either for uplink or for downlink transmissions. In FDD mode, both uplink and downlink can transmit at the same time at different spectrum frequencies. In TDD mode, both uplink and downlink use the same spectrum frequencies but at different times.

The RF radios and antennas use a fixed input power that is based on full load RF conditions. When commercial power is interrupted, lost, or dramatically reduced, the RF radio is not able to receive notice to modulate its power consumption accordingly. In other words, the RF is not informed, nor is the RF radio configured to be advised of a commercial power loss and can change or drop its preconfigured input power requirements. The inability to change the input power requirements of the RF radio results in lower performance in its operation by causing a faster drain on its battery backup systems.

The 5G New Radio (NR) is the global standard for a unified, capable 5G wireless interface, can deliver a faster broadband experience, and is designed to have an initial bandwidth part (BWP) that is used by all the UE during initial access and dedicated BWP for a UE or group of UEs that will apply for data allocations. The BWP adaptation is controlled by a gNB node (radio access network (RAN)+ distributed unit (DU)/centralized unit (CU) for 5G). There can be multiple smaller BWP(s) that will be predefined by the operator to be used during AC power outages (i.e., a RAN slicing architecture that has multiple sets of functional splits and function placement in one cell). In an exemplary embodiment, another option is to use a gradual reduction in the operating BWP. For (e.g., to start with only a 25% percent reduction in BW and then gradually move to lower numbers if the power is not restored). With this process, the user experience can avoid degradation in the case of short AC power outages. The network slicing can also be linked to the BWP, during an AC power outage or light network load operations, the minimization of the power consumption gNB can be done by control of the slice and BWP mutual association. For example, the operator can choose to merge all the available slices into the smaller BWP. The operator can choose to define the BWP and slice mapping during an AC power outage when there are multiple BWP defined that are made available during AC power outages The virtualization of the radio access network (RAN) of next-generation (5G) wireless systems enables applications and services are physically decoupled from devices and network infrastructure. This enables the dynamic deployment of different services by different network operators over the same physical infrastructure. RAN slicing utilizes virtualization allows the operator to provide dedicated logical networks with customer-specific functionality without losing the economies of scale of a shared infrastructure When implementing these virtual networks, mobile devices and other user equipment can experience challenges in properly connecting and operating in environments where each network provides different "slices" of bandwidth for various quality of service (QoS).

In reconfiguring to 5G base stations, the 4G two-port transceivers have been replaced with four-port radios, enabling the use of multiple-in, multiple-out (MIMO) transmission to improve spectral efficiency. The MIMO enhances signal strength and helps reduce interference. Eight-port radios take beamforming a step further to provide additional efficiency gains. The nascent 5G technology will take full advantage of beamforming by using 16 or 64 transmit/receive chains (16T/16R, 64T/64R) and radio-integrated antennas operating at 2.3 GHz and higher.

Power amplifier efficiency has improved significantly and is due primarily to more sophisticated linearization techniques and higher output power capabilities. However, next-generation "massive MIMO" active antenna unit (AAU) radios will require a large number of lower-power amplifiers for each AAU radio. Linearizing each small amplifier would be costly and marginally effective since the additional circuitry would itself consume much of the power it could save, and therefore is not a feasible solution. In this case, power efficiency could quite possibly take a turn for the worse.

It is desirable to achieve cost savings using intelligent solutions to reduce the power consumption of 5G base stations when operating in a backup power mode while meeting sufficient regulatory operating requirements to prevent a shut-down of the radio transmitter.

It is desirable to limit the number of backup power supplies that are needed for use when operating the 5G base station in a backup power mode for component cost savings, current usage, and efficiency.

It is desirable to provide systems and methods for operating adaptive mini-slot management to monitor power and channel traffic at a plurality of cell sites in the network; to enable and disable a set of mini-slots in a downlink (DL) pattern and an uplink (UL) pattern including at least two concatenated patterns jointly repeated with periodicity in a slot configuration period for new radio (NR) communications by users at cell sites in the network; and in response to a request by a user, to reserve a number of mini-slots for use in each slot configuration period wherein a reserved slot number is responsive to at least one of a condition of an AC power outage, and reduced channel traffic based on data received by the DU/CU about the condition.

It is desirable to provide systems and methods initialize a set of mini-slots for use when scheduling the UE with by mini-slot assignments to dynamically inform the UE about a UL transmit and DL receive patterns for each mini-slot configuration period wherein an initial set of mini-slots are enabled in response to data received about a loss of power and to reduce channel traffic at mini-slots from the DU/CU monitoring cell sites of the network. Also, it is desirable to implement a time-domain based schedule to reduce power consumption in the UL and DL transmissions by reductions in slot time via changing a frequency of the mini-slot configuration period by applying a set of time-domain scheduling periods for a select number of mini-slots to be enabled in each time-domain scheduling period.

It is desirable to provide systems and method for operating management of base stations components that enable the smart management of power consumption by implementing adaptable bandwidth control and slice offering at cell sites (i.e., nodes) or enabling automated systems to reconfigure component based on examination of the current traffic loading on the antenna to change the mode of operation of the RF radio transmitter based on evaluating if a degraded RF radio service can be implemented under the current conditions. If it is possible, the RF EMS or orchestration system will execute a workflow to drop the input power requirements on the RF radio. This can reduce the current power draw that can result in increases in the amount of time the RF radios/antennas can operate in a backup UPS power mode and provide service.

It is desirable to implement processes where the operator can choose to close some slice offerings and continue only higher priority slice(s). The Radio AC power outage detection by DU/CU, DU/CU, or NFMF can also detect AC power outage via FCAPs and activate the solution. During an AC power outage, the RAN will notify to the control unit (DU: Distributed Unit or CU: Central Unit). The DU/CU will initiate moving of all user traffic to the designated lower BWP(s) (e.g., initial BWP) while shutting down all the other BWP in the current operating carrier. Based on the configuration, the DU/CU will move all the users and/or slices to the smaller BWP(s) during an AC power outage or during light network load to minimize power consumption gNB and will notify the users of the change in the assigned BWP. The Users will stop monitoring the current BWP and will immediately start following only the lower BWP.

In a multi-carrier operation, the DU/CU can also move all the traffic to a single carrier based on BWP or slice prioritization configurations. After full power restores or loading on the RAN has increased, gNB can re-activate all the dedicated BWP or slices and move the users seamlessly to their respective BWP or slice(s). The reduced bandwidth assignment to UE in Multi-User MIMO (MU-MIMO) operation. If the RAN Scheduler is operating in MU-MIMO operation and decides that all serving users can be assigned to the same lower PRBs, DU/CU can turn off transmission on other sub-carriers thereby resulting in power saving. The lower PRBs assignment for MU-MIMO can be prioritized based on BWP and/or Slicing predefined priorities.

It is desirable to change required levels on the input power setting of the RF radio in response to feedback messages of detected input commercial power level changes or interrupts by the RF radio to reduce the operating RF radio power consumption. The RF radio operating power setting is reduced based on the immediate operational requirements, including determinations of the available RF service on the antenna/radio to provide for a prolonged operating time of airtime of the antenna reception and RF radio transmitter.

It is desirable to enable automated systems to reconfigure components based on examination of the current traffic loading on the antenna to change the mode of operation of the RF radio transmitter based on evaluating if a degraded RF radio service can be implemented under the current conditions. If it is possible, the RF EMS or orchestration system will execute a workflow to drop the input power requirements on the RF radio. This can reduce the current power draw that can result in increases in the amount of time the RF radios/antennas can operate in a backup UPS power mode and provide service.

It is desirable to provide systems and methods that when the RF radio of the operating cell (i.e., gNB node) incurs a drop or interrupt of commercial power at the input to the base station the operational systems are altered to compensate for the loss of commercial power to a reduce RF radio current draw.

Wireless mobile communication technology uses various standards and protocols to transmit data between a base transceiver station (BTS) and a wireless mobile device. The deployment of a large number of small cells presents a need for energy efficiency power management solutions in fifth-generation (5G) cellular networks. While massive multiple-input multiple outputs (MIMO) will reduce the transmission power, it results in not only computational cost, but for the computation required, the input power requirements for transmission can be a significant factor for power energy efficiency (especially when operating in a backup mode) of 5G small cell networks. In 3GPP radio access networks (RANs) in LTE systems, the BTS can be a combination of evolved Node Bs (also commonly denoted as enhanced Node Bs, eNodeBs, or eNBs) and Radio Network Controllers (RNCs) in a Universal Terrestrial Radio Access Network (UTRAN), which communicates with the wireless mobile device, known as user equipment (UE). A downlink (DL) transmission can be a communication from the BTS (or eNodeB) to the wireless mobile device (or UE), and an uplink (UL) transmission can be a communication from the wireless mobile device to the BTS.

The power consumption of base stations (BSs) is classified into three types, which are the transmission power, the computational power, and power for base station operation. The transmission power is the power used by the power amplifiers (PAs) and RF chains, which perform the wireless signals change, i.e., signal transforming between the baseband signals and the wireless radio signals. The computation power represents the energy consumed at baseband units (BBU's), which includes digital single processing functions, management, and control functions for BSs and the communication functions among the core network and BSs. All these operations are executed by software and realized at semiconductor chips. The additional power represents the power consumed for maintaining the operation of BSs. More specifically, the additional power includes the power lost at the exchange from the power grid to the main supply, at the exchange between different direct current to direct current (DC-DC) power supply, and the power consumed for active cooling at BSs.

Power loss and outages are commonplace in networks today as a result of natural disasters, rolling brownouts, etc. Base stations include backup power (e.g., batteries), these forms of backup power may not provide sufficient power during lengthy AC power outages, the use of commercial wireless communications services may increase due to users' needs and/or desires.

Operating the BS in a sleeping mode can be a way to reduce energy consumption in cellular networks; however, this method focuses on the output power and does not consider a loss or interrupt of the commercial power on the input to the B.S. Hence, queueing decision techniques for BS sleeping techniques while can maximize energy-efficient utilization of the BSs in a green communication network is not applicable when commercial power is lost to the BS.

The physical or network node either represents an access node (e.g., Radio Distributed Units) or non-access node (e.g., servers and routers), while a physical link represents an optical fiber link between two physical nodes. Every physical node is characterized by a set of available resources, namely computation (CPU), memory (RAM), and storage, which define the load characteristics of a cell. Each physical link is characterized by a bandwidth capacity and a latency value, which is the time needed by a flow to traverse that link. Finally, both physical nodes and links have associated utilization power requirements for each type of available resource.

The power delivery to a BS is rectified and regulated to a nominal measured DC voltage 48 (i.e., voltage direct current (VDC)), which is fed to a backup battery or a set of backup batteries for charging. The rectifier unit includes circuitry to keep the batteries fully charged and ready in case of a commercial power interrupt or failure. At full charge, the backup battery is kept at a voltage in the vicinity of 50 volts. Also, the vendors/operators may opt for a DC voltage of −24V or other DC voltage setting and not the typical 48V setting. The battery pack parameter in general per customer's requirement is in the order of 2-hour work time or other operator backup time settings (e.g., the operators may choose a 2-hour battery backup, 4-hour or 8-hour . . . as desired or required for operations) under 100 W (in this case, the power is calculated per RU power consumption and is a variable quantity . . . ) AC system, 48.1V/65 Ah battery that can last for about 150 minutes with a full load.

Base stations typically use a 48V input supply that is stepped down by DC/DC converters to 24V or 12V, which can be reduced to meet the DC voltage level of each module.

In the 3GPP specification, the receive and transmit bandwidth of a UE can be adjusted to a subset of total cell bandwidth referred to as BWP. The bandwidth can be configured to shrink during a period of low activity for power reduction, and also the bandwidth location can be changed to allow different services. In an exemplary embodiment, the bandwidth adaption can be achieved by configuring the UE with BWP(s) informed to the UE of which of the configured BWPs is currently active one.

FIG. 1 shows a graphical representation of a 5G or other data network 100 that includes multiple cells 121, 122, 123 that provide access to a network 105 for any number of UE devices 110. Although FIG. 1 shows only one user equipment (UE) device 110 for simplicity, in practice the concepts described herein may be scaled to support environments 100 that include any number of devices 110 and/or cells 121-123, as well as any sort of network architecture for assigning bandwidth to different slices and performing other tasks, as desired.

In the example of FIG. 1, a mobile telephone or other user equipment (UE) device 110 suitably attempts to connect to network 105 via an appropriate access cell 121, 122, 123. In the illustrated example, each cell 121 includes the components for transmission of a base station controller 131, a base station transceiver 138, a node 140, an RF Radio 135, a Radio Network controller 142; the linking components of the antenna interface 132 and the antenna 133; and the power components of the commercial power interface 150, the backup power supply 152 of a battery circuitry 154 and UPS or batteries 156. The The commercial power interface 150 may receive power AC power from a public utility or other sources. The antenna 133 and antenna interface 132 control the signal to the UEs 110. The radio network controller 142 can control the RF transmit output via the RF radio 135 to conserve power usage to reduce the power draw on the USP 156. By reducing the communication bit rate, the RF power can be reduced in decibels ("dB"). Additionally, step reductions can be implemented. The battery circuit 154 can be configured as a rectifier type switch that can switch the output power from the UPS 156 at multiple levels. The Base Station controller 138 can include power control features to control the power drawn by the base station 138. Additionally, the base station controller 138 can communicate wirelessly with a power management system 170 that can confirm the AC power outage or interrupt on the front end to change the power input power levels of multiple small cells 121, 122, and 123, and a number of UEs 110 connected to the Node 140 and resources in a slice of a node (gNB).

In an exemplary embodiment, UEs 110 can be configured with a maximum of 4 BWP for Downlink and Uplink, but at a given point of time, only one BWP is active for downlink and one for uplink. The BWPs can be configured to enable each of the UEs 110 to operate in a narrow bandwidth, and when the user demands more data (bursty traffic), it can inform gNB to enable full bandwidth. When gNB configures a BWP, it includes parameters: BWP Numerology (u) BWP bandwidth size Frequency location (NR-ARFCN), CORE-SET (Control Resource Set). For Downlink, UE is not expected to receive PDSCH, PDCCH, CSI-RS, or TRS outside an active bandwidth part. Each DL BWP includes at least one CORESET with UE Specific Search Space (USS) while Primary carrier at least one of the configured DL BWPs includes one CORESET with common search space (CSS). For the uplink, UE 110 shall not transmit PUSCH or PUCCH outside an active bandwidth part. UEs 110 are expected to receive and transmit only within the frequency range configured for the active BWPs with the associated numerologies. However, there are exceptions; a UE may perform Radio Resource Management (RRM) measurement or transmit sounding reference signal (SRS) outside of its active BWP via measurement gap In an exemplary embodiment, the radio network controller 131 can implement logic is implemented with computer-executable instructions stored in a memory, hard drive, or other non-transitory storage of device for execution by a processor contained within. Also, the radio network controller 131 can be configured with a remote radio unit (RRU) 160 for downlink and uplink channel processing. The RRU 160 can be configured to communicate with a baseband unit (BBU) 139 of a base station controller 131 via a physical communication link and communicate with a wireless mobile device via an air interface.

In various alternate embodiments, the base station 138 can be separated into two parts, the Baseband Unit (BBU) 139 and the Remote Radio Head (RRH) 141, that provides network operators to maintain or increase the number of network access points (RRHs) for the node (gNB), while centralizing the baseband processing functions at a master base station 175. Using a master C-RAN base station 175, the power management system, 170, can be instructed to coordinate operations in the tangent of power levels of multiple cells (121, 122, and 123).

Figure 2:
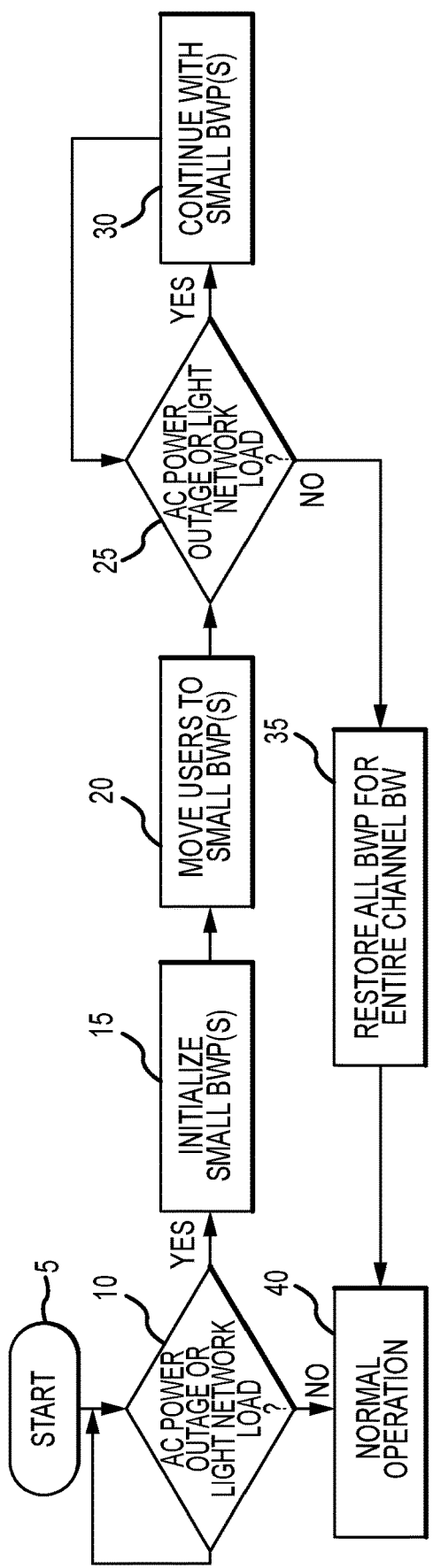
FIG. 2 illustrates an exemplary diagram of a feedback communication loop for power management of a base station responsive to a commercial power interrupt or failure of the base station power management system in a wireless data networking environment in accordance with various embodiments.

FIG. 2 is an exemplary flow diagram of a smart bandwidth adaptation call flow of the smart bandwidth (BW) adapter controller in accordance with various embodiments. In FIG. 2, initially at step 5, the smart BW control is enabled or always configured in on-state monitoring for a AC power outage or light network load. At step 10, detection by the BW adapter controller is made as to whether a change in state is occurring of a AC power outage or light network load. For example, a feedback communication loop for power management of a base station responsive to a commercial power interrupt or failure of the base station power management system in a wireless data networking environment. Radio AC power outage detection by distribution unit (DU) or central unit (CU) connected to the 5G network.

The Distributed Unit (DU) or Central Unit (CU) or management function (NFMF) can also detect AC power outage by using the network model of Fault, Configuration, Accounting, Performance, Security (FCAPS) and activate the appropriate solution. For example, during a AC power outage, the RF radio will notify to the control unit DU/CU and the DU/CU units will initiate moving of all or nearly all of the user traffic to the designated lower BWP(s) (e.g., initial BWP) while shutting down all or almost all of the other BWP in the current operating carrier.

Next, if there is determined that there is an AC power outage or light network load at the node, then at step 15, the small BWP(s) will be initialized. The initial active small BWP(s) are for a UE during the initial access until the UE is explicitly configured with BWPs during or after the establishment of the RRC connection. The initial active BWP is the default BWP unless configured otherwise.

At step 20, move or assigns users to small BWP(s). For example, based on the network configuration, the DU/CU may move all or nearly all the users and/or slices to the smaller BWP(s) during the AC power outage or during the light network load to minimize power consumption. The gNB will notify the UEs of the change in the assigned BWP. The UEs will cease to monitor the current BWP and will switch to immediately monitoring only the lower BWP. In a multi-carrier operation, the DU/CU can also move all the traffic to a single carrier based on BWP and/or slice prioritization configurations.

The reduction from a wider bandwidth has a direct impact on the peak, and users experienced data rates. By operating UEs with smaller BW than the configured CBW, it reduces power and still can allow support of the wideband operation. At step 25, the adaptive bandwidth module continues to monitor for an AC power outage or light network load if the commercial power is resumed then at step 35, the BWP is restoring for the entire channel. After full power restores or loading on the RAN has increased, gNB can re-activate all the dedicated BWP and/or slices and move the users seamlessly to their respective BWP and/or slice(s).

At step 40, the normal operation is resumed again, and the power consumption levels are raised. Alternately, at step 25, if there is still determined to be an AC power outage or light network load, then at step 30, the feedback operation occurs to delay restoring the normal operation with all the BWPs for the entire channel BW The node is still placed in a limited operational state configured with the small BWP(s), and the BW adaptive unit continues to wait for the resumption of the commercial power or increased loads.

The reduced bandwidth operations and the corresponding assignments to the UEs can also occur in a Multi-User MIMO (MU-MIMO) operation if a RAN Scheduler is operating in MU-MIMO operation and decides that all or nearly all of the current serving users can be assigned to the same lower physical resource blocks (PRBs). In this case, the DU/CU units can shut off the current transmission that is occurring on other sub-carriers (i.e., each PRB can consist of up to 12 subcarriers) which will also result in power savings of the BS The lower PRBs assignments for MU-MIMO can also be prioritized based on the BWPs active and/or the slicing priorities that have been predefined.

Figure 3:
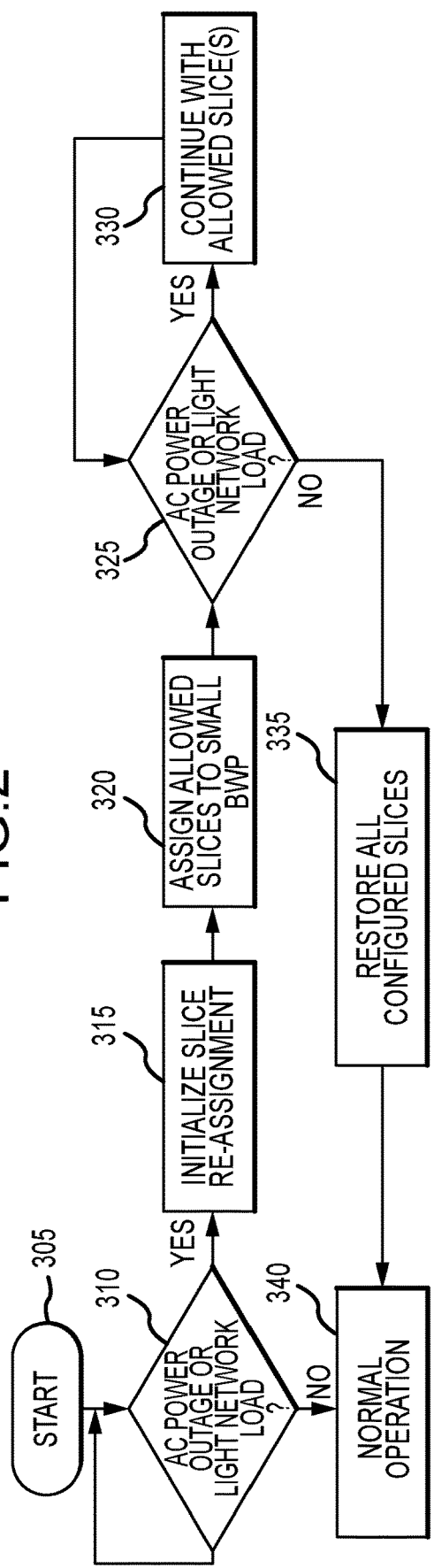
FIG. 3 illustrates an exemplary flowchart for power management of a base station responsive to a commercial power interrupt or failure of the base station power management system in accordance with various embodiments.

FIG. 3 is an exemplary flow diagram of a smart bandwidth adaptation call flow of the smart bandwidth (BW) adapter controller in accordance with various embodiments. In FIG. 3 at step 305, in the smart BW adaptation call-flow, like in FIG. 2, the BW adapter controller is initiated, and at step 310 determines whether a change in state is occurring of an AC power outage or light network load is being operated at the node. If the determination is in the affirmative, then at step 315, the initialize slice reassignment process takes place. At step 320, various slices are reassigned to small BWPs from their current slice assignments. The network slicing is configured that each active slice is tied to respective BWPs which enable during the AC power outage or light network load the systematic automated transfer of each active slice to a BWP in a scheduled order to reduce the power consumption by the UEs accessing the gNB by preconfigured slice control and BWP association For example, an operator can choose to merge all the active slices in the network or at a node into smaller BWPs. The operator may choose to define profiles, settings, etc. of each BWP that make up the BW and also alternative slice mappings for assignment during the power interrupt, AC power outage, light network load, etc. and this can be beneficial when there are multiple BWP that can be defined for usage in such conditions when the full BW is not needed or when power savings are desired. The offering or selections can be assigned all at once, incrementally, and also can be reassigned to normal operation in a likewise manner. The operator also can simply choose to close some slice offerings when desired and continue to enable only certain higher priority slice(s) for access by premium, or both premium and non-premium used. Further, usage can be selected for an entire preset period or configured for a given duration to select user sets. At step 325, the BW controller adaptor like in FIG. 2, continues to check whether the commercial power has not been restored and, if not, then continues via step 330 with the configured mapped slices selected for reduced power or load operations. At step 335, once the commercial power is resumed or the load is increased beyond a certain threshold, all the slices that have been prior or can be enabled without the prior restrictions will be restored, and normal operations will be restored to all the UE's given access.

Figure 4:
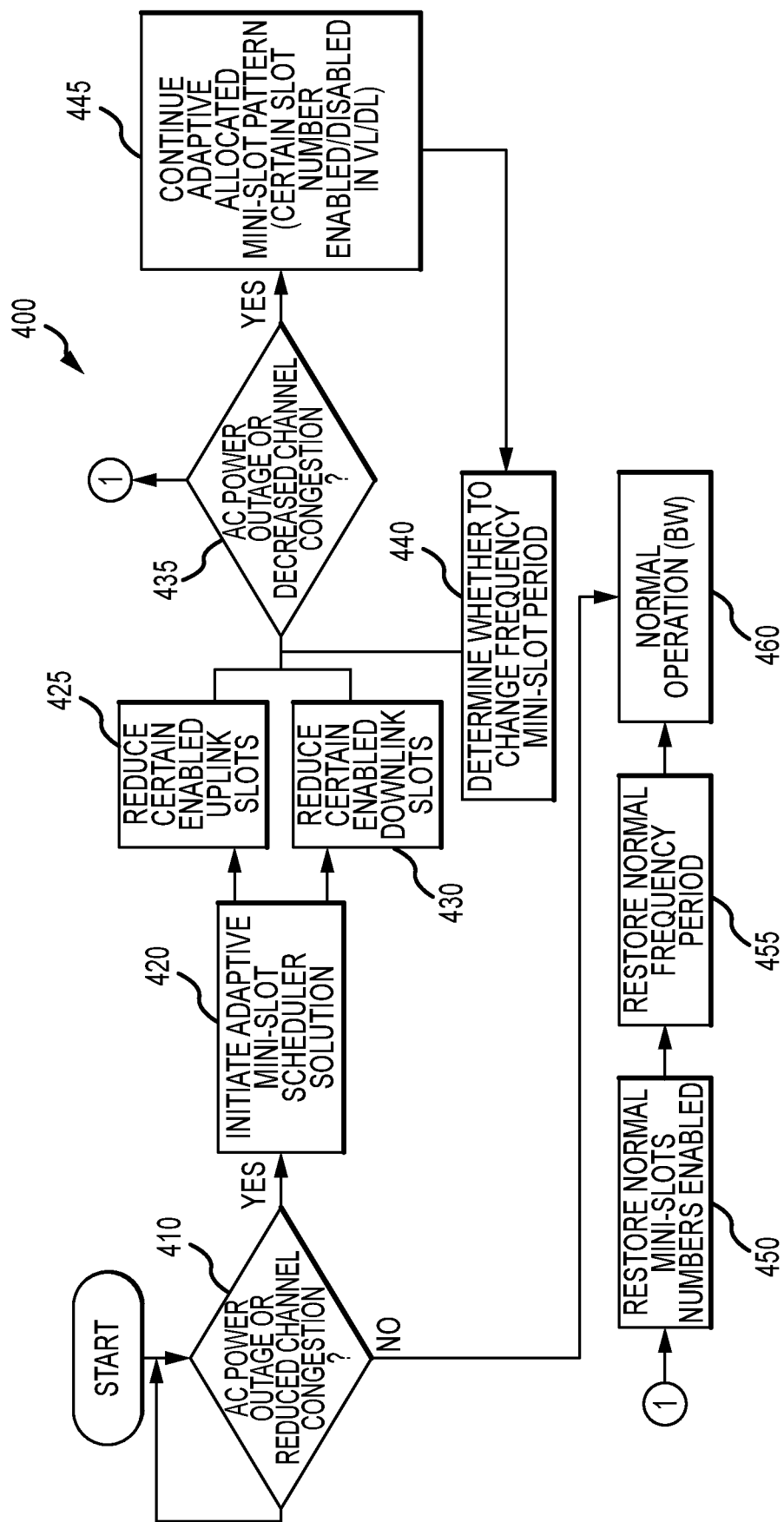
FIG. 4 illustrates a flowchart of an adaptive enabling slot scheduling solution for mini-slot scheduling in accordance with various embodiments.

FIG. 4 illustrates a functional diagram of mini slot configuration before and after a AC power outage of an exemplary smart scheduler for mini-slot allocation and adaptation call-flow in accordance with various exemplary embodiments. In various exemplary embodiments, in FIG. 4 the network 400 in response to an AC power outage or light load at 410 can provide a desired DL/UL transmission pattern to UL and DL requests from various UEs. In FIG. 4, in an exemplary embodiment, there is shown an operating carrier (e.g., 20 MHz) with a default BWP arrangement coupled to a scheduler unit before the AC power outage that schedules data with all the slots enabled for the use of the UE during the initial access for the data allocation by gNB (i.e., RAN+DU/CU). If an AC power outage occurs or there is a light load, and some of the channels are not used, then at 420, the mini-slot algorithm is enabled for enabling and disabling certain mini-slots in a slot configuration period. As mentioned, Mini-slot occupies 2, 4, or 7 OFDM symbols in the normal slot configurations and can assist in achieving low latency in data transmission. The PDSCH channel is used to carry DL user data, and the 5G channel types cover logical channels and transport channels used in uplink and downlink with a mapping between them. In response to the mini-slot scheduling at 420, in the uplink channels at 425, and the downlink channels 430, the number of mini-slots is reduced. Likewise, in the downlink channels, the number of mini-slots can also be reduced. That is, the scheduler only enables certain mini-slots. At 435, once again, the network determines if the AC power outage or light load is continuing. If not, the application reverts back to restore normal slot operation 450, and the mini-slot not enabled, are enabled, and the channel for normal slot operation is restored. By reducing the mini-slot number, reduces the time for the UE to receive a message, and reduces the wait time for transmission (latency receipt and wait times). The UE proportional time in the connected state is reduced after receiving or transmitting the last packet. After this, UE would transition to an idle state, hence the power consumption of the UE is reduced (i.e., a tradeoff of the connection latency time by the UE).

Figure 5A:
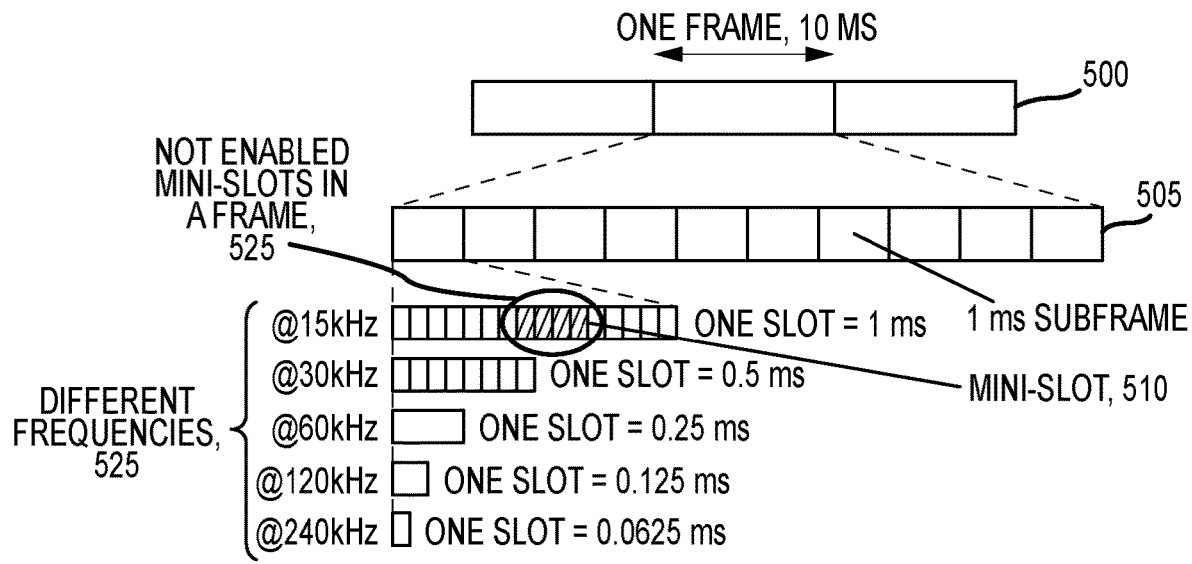
FIGS. 5A and 5B illustrates exemplary diagrams of an mini-slot architecture in accordance with various embodiments.
Figure 5B:
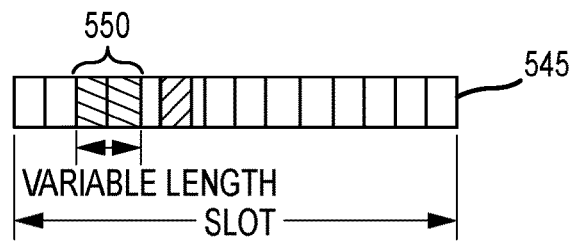

FIG. 5A illustrates an exemplary diagram of the parts of the slot, mini-slot that are configured in different frequency periods in scheduling patterns by a scheduler responsive to a power outage, or decreased channel congestion detected in a network in accordance with an embodiment. In FIG. 5, a frame 500 is configured in multiple slots 505, each with mini-slots 510 allocated for DL and UL transmission. In this case, a set of mini-slots 510 defines a slot 505 in the channel for the UP and DL communications. In FIG. 5b, the number of mini-slots 545, can be reconfigured in number and increased or decreased for use in DL 550 and UL 555 as desired. Hence, a lesser number of mini-slots can be scheduled or enabled for either function. The NR time-domain structure consists of 10 ms radio frame divided into 10 subframes each of 1 ms. The period for each mini-slot can be changed (In FIG. 5B) to vary the length. The subframe 505 is, in turn, divided into slots consisting of 14 OFDM symbols each, which means that the duration of the slot in milliseconds is dependent on the numerology. Having a longer transmission duration (setting a different frequency) helps to increase coverage or reduce the overhead due to switching (in TDD), the transmission of reference signals, and control information. The number of subcarriers is reduced by half, but the number of slots per symbol per time unit is doubled. The same frame structure can be used for FDD, by enabling simultaneous reception and transmission (that is, DL and UL can overlap in time). In that case, the DL slot structure can be used by the device that is initiating (or scheduling) the transmission, and the UL slot structure can be used by the device responding to the transmission. In various exemplary embodiments, the scheduler can reduce enabled slots 525 (i.e., for either the UL or DL transmission), for example implementing mini-slots 510, which do not require all 14 symbols in a slot 505 configuration for scheduling to manage power consumption without causing any cell site interruptions in service.

For reduction of power, a latency of less than 1 ms means that the scheduling interval implemented by the scheduler should be reduced below 1 ms for various services. Using mixed numerologies, the mini-slot intervals (For example, 520, 515) are reduced (i.e., to reduce the time as the slot time is decreased with higher numerology). Therefore, the scheduler can change the reduce the mini-slot configuration period by changing the frequency and also reduce the latency time for the DL and UL transmissions by not enabling mini-slots that do not carry traffic. In an exemplary embodiment, the 5G NR, the UE can be configured with up to 4 BWPs of different numerologies, which can be used to reduce the latency for certain services. If a device is capable of simultaneous reception of multiple bandwidths parts, then on a single carrier, mixed transmissions of different numerologies for a single device can be performed.

In the downlink, a device is not assumed to be able to receive downlink data transmissions, more specifically the PDCCH or PDSCH, outside the active bandwidth part. The numerology of the PDCCH and PDSCH are restricted to the numerology configured for the bandwidth part. In the uplink, a device transmits PUSCH and PUCCH in the active uplink bandwidth part only.

Also, since a slot is defined as a fixed number of OFDM symbols, a higher subcarrier spacing (At higher carrier frequency) leads to a shorter slot duration, which can be used to support lower-latency transmission. The NR allows for the transmission over a part of the slot by the mini-slot transmission, and this transmission can also preempt the other ongoing transmission allowing for immediate transmission of data requiring very low latency.

Figure 6:
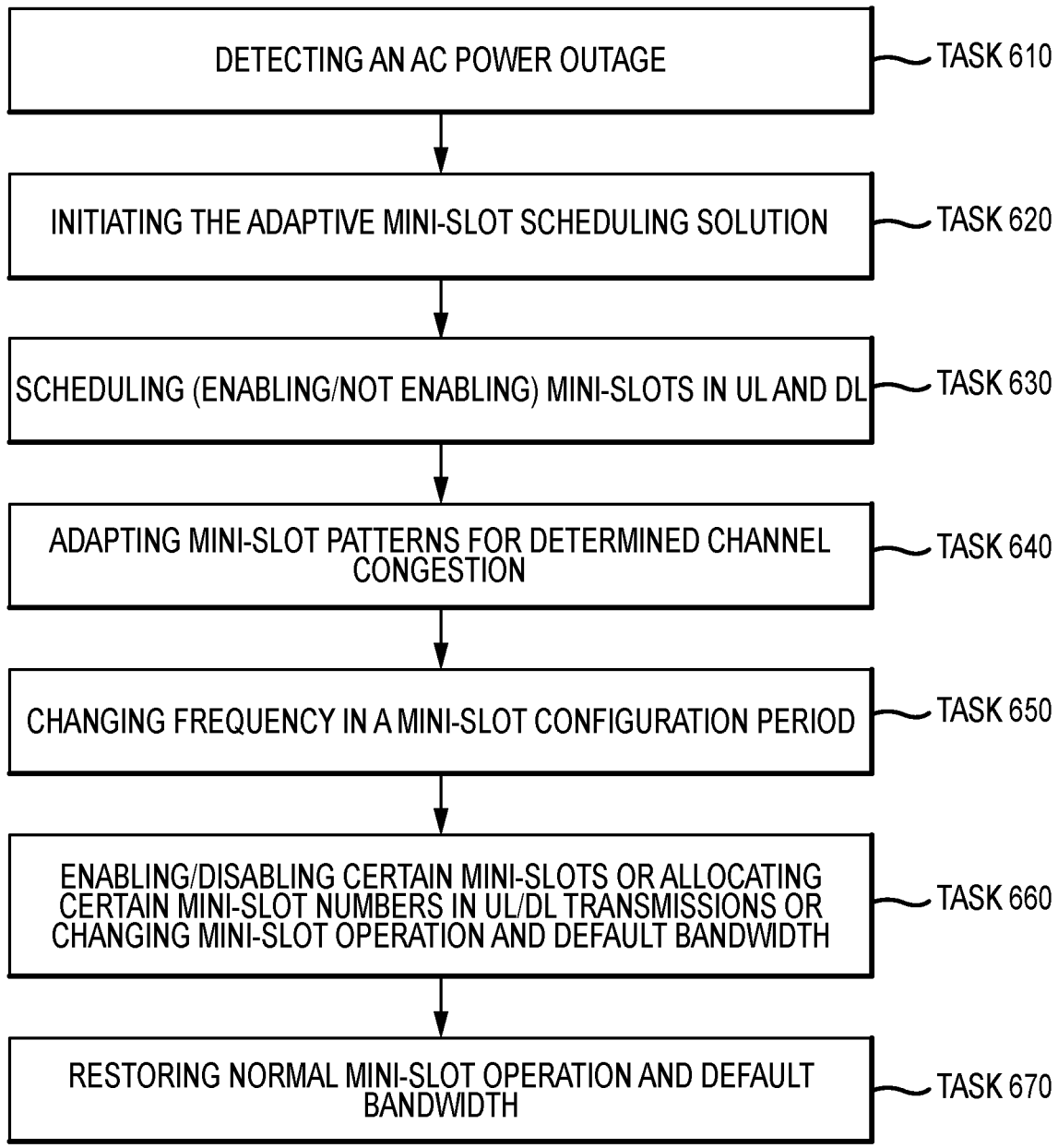
FIG. 6 illustrates an exemplary flowchart of scheduling mini-slots responsive to AC power outages, power interrupts, or channel usage in accordance with various embodiments.

FIG. 6 illustrates an exemplary flowchart of reassigning users allocating various patterns of mini-slots by the scheduler at different frequencies to reduce power usage responsive to AC power outages, power interrupts, or light channel traffic detected in accordance with various embodiments. In FIG. 6, at task 610, an AC power outage is detected, or it is determined in response in a variety of ways, for example via feedback (i.e., messages) communicated and received by the Base Station controller of an impending AC power interrupt or AC power outage detected in another part of the network, from the monitoring of the input current to the current Base Station, or from monitoring traffic channel congestion at various slots and mini-slots in use for UL and DL transmissions.

As a result, at task 620, the adaptive mini-slot scheduling pattern solution is executed by a scheduler for changing the current slot, and mini-slot configuration to a reduced set of mini-slots for UL and DL transmissions and also changing of the frequency to reduce power consumption at a node. For example, the Base Station may be currently operating via a carrier of a select frequency (e.g., 15 kHz) with a default slot configuration with mini-slots. Also, at the same time, a complementary BWP arrangement of four BWP parts of an initial BWP and other BWPs (1 to 3) may also be in use that make up the entire BWP in use for the UE (i.e., essentially all of the UEs in use) connected with the initial access in use for data allocation by the gNB (i.e., RAN+DU/CU). At task 630, a multiple set of mini-slots are defined and patterned for use in the UL and DL transmissions. In each set of mini-slots in the UL and DL transmissions, some of the mini-slots in the mini-slot configuration period in the UL and DL are enabled and some disabled for better latency and less power consumption. At task 640, the pattern of mini-slots for the UL and DL transmits is adapted as determined by traffic channel congestion on each mini-slots used. At task 650, the scheduler may decide (or determine) to change the frequency for the slot configuration period from 1 ms to 0.5 ms etc. For example, the frequency can be increased from 15 mKHz, to 30 mKhz etc., and with each increase, the period is reduces in half and the number of mini-slots remains constant. The duration of each mini-slot is reduced. This supports a low latency and reduced power consumption for each mini-slot transmission by enabling UL and DL transmissions over variable periods for each mini-slot based on a set of frequencies, and a mini-slot is a fraction of a slot. Also, the UL and DL transmissions are not enabled to mini-slots to receive DL and UL data transmissions outside an active bandwidth part. Also, a frequency of the mini-slot configuration period by applying a set of time-domain scheduling periods to a select number of mini-slots is enabled in each time-domain scheduling period. The scheduler unit can also use a certain number of OFDM symbols to enable a dynamic set of mini-slots to send and receive data requests in scheduled operations and can allocate OFDM symbols to enable and disable a certain number of mini-slots in the slot configuration period to deliver channel traffic when a mini-slot allocation over a large bandwidth is deemed by the scheduler unit is unnecessary due to decreases in amounts of data transmitted that results and is indicative of less active mini-slots required at a cell site.

At task 660, the scheduler continues to adapt the mini-slot pattern to the outage or channel traffic levels by enabling or disabling certain mini-slots or allocating more or fewer mini-slots to the DL or UL transmissions and to change the frequency to reduce latency and power consumption in configured mini-slot periods. At task 670, if the AC power is restored or the channel congestion levels increase, certain mini-slots are enabled in the DL and UL transmissions to an eventual normal operating state. Also, the frequency is decreased to a normal mini-slot configuration period of 1 ms at 15 kHz. The active BWPs may also be increased or decreased to keep a certain threshold of the QoS of the cell site during the changed power or load conditions.

Figure 7:
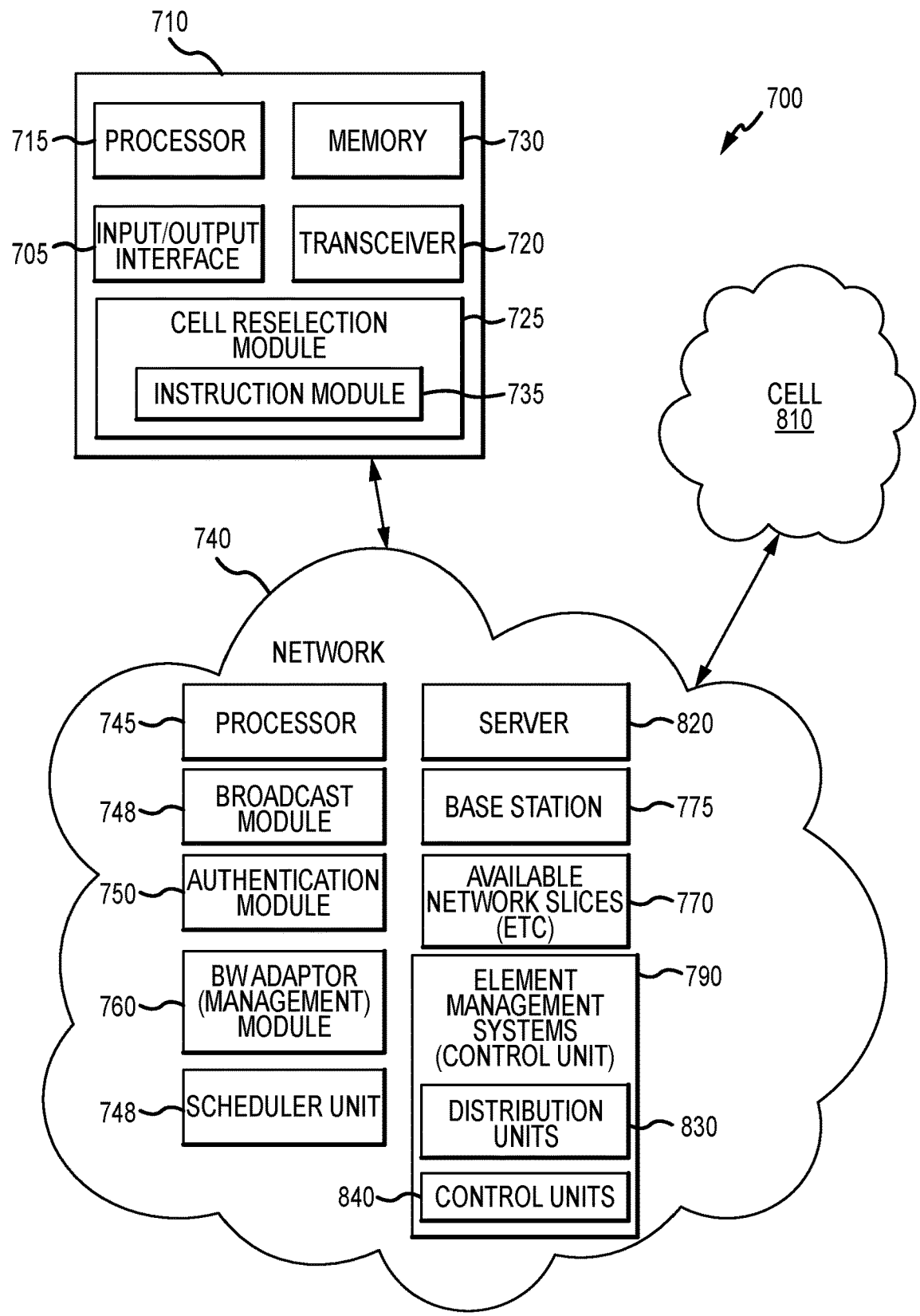
FIG. 7 illustrates a diagram of an example of user equipment (UE) and network architecture, for example, an automated process for reducing power consumption in accordance with various embodiments.

FIG. 7 is an exemplary illustration of a UE and network configuration in accordance with an embodiment. The UE 710 includes a processor 815 for performing various logic solution functions for registering and receiving broadcast system information, initiating PDU sessions performing cell selections and reselections, ranking neighboring cells, configuring different modes of operation of the UE, etc. . . . . The UE 710 may include a cell reselection module 725, input/output interfaces 705, memory 730 for storing measurement reports, rankings data of neighboring cells, and a measurement module 735 for calculating by various solutions distances and other criteria for neighboring cells, etc., and for accessing cells within the vicinity for the premium and non-premium users. The network 740 may include a base station 775, processor 745 for registering UE for slice access, cell ID modules 755, broadcast module 748 for broadcasting slice ID, slice offset values for neighboring cells and other system information, authentication module 750 for authenticating a UE, network slices 770, etc., and a BW adaptation module 760. The UE 710 communicates with the network and reads broadcasted system information at a cell 810 in which the UE 810 is camped in an idle mode. For example, if the UE 710 is camped at a cell A, then the UE 710 would receive slice IDs and slice offset values for neighboring cells of cell A via the transceiver 720 and process the information via the processor 715 to perform measurements and calculate using cell reselection equations of the cell reselection module 725 (e.g., using a cell reselection logic or process) to select a next cell where the cell reselection process is based on a ranking of the neighboring cells.

The scheduling unit 755 can communicate (like the BW adaptation module 760) via element management systems (EMS) 790 (i.e., control unit) to direct various logic components like a scheduler allocating slots, mini-slots and setting mini-slot configuration periods by managing a set of frequency settings by an automated workflow of the cell 810 of the parts (shown in FIG. 1) of the radio receiver, the UPS, battery circuit (i.e., DC power supply), the cell site (i.e., node) calls/dropped calls/throughput in operation, the server. The EMS 790 monitors via the distribution units (DUs) 830 and the central units (CUs) 840 the various nodes and cells in the network and controls or send instructions to the various components of the cell 810 to maintain the quality of service (QoS) of the cell site. The automated workflow maintains the network availability and monitors the status of network devices, including the commercial power supplied to the network. The EMS 790 can also be connected to multiple eNodeB for power management. When an AC power outage in the network occurs, the automated workflow which is monitoring the network instructs the EMS 790 via various logic components to reduce the output power of the radio receiver and also takes into account other factors by communicating with the radio receiver, cell site via a router (or another communication link) connected to the server 820 in reducing the output power for transmission. This, in turn, reduces the DC power and the draw on the UPS.

In an exemplary embodiment, the server 820 can be configured as NB-IoT Server is a software for data collection and monitoring and communicating via the router for activating the automated workflow via the EMS 790 and can display the log messages of each base station and the survival status of all sessions (including information such as signal, power, etc.).

After the detection of an interrupt of the commercial power, power failure, power loss, and/or AC power outage of the network, the automated workflow, which is monitoring the components and the network, detects the change and the power loss. The automated workflow in response to the detected power loss implements the configuration management functions via the scheduling unit 755 for mini-slot allocations and frequency settings, the BW adaptation module 760 of slice assignments, and available BWPs at the cell 810. The EMS 890 communicates with the radio receiver, the server 820, and other components associated with the cell site, to send messages via the cell site router to receiver collect cell statistics, and to execute appropriate plug and play functionality of the base station radio receiver. The automated workflow executes various functions to the element management system based on decisions from the BW adaptation module 760 and data from the cell site and base station.

As described, a power management system includes several data processing components, each of which is patentable, and/or have patentable aspects, or having processing hardware capable of performing automated processes that are patentable. This document is not intended to limit the scope of any claims or inventions in any way, and the various components and aspects of the system described herein may be separately implemented apart from the other aspects.

The invention claimed is:

1. A system for adaptive mini-slot management in a network, comprising:
    an element management control unit comprising a set of distribution and central units (DU/CU) to monitor data of an AC power outage and data of reduced channel traffic at a plurality of cell sites in the network;
    a scheduler unit for user equipment (UE) to enable and disable a set of mini-slots in a downlink (DL) pattern and an uplink (UL) pattern comprising at least two concatenated patterns jointly repeated with periodicity in a slot configuration period for new radio (NR) communications by users at cell sites in the network; and
    in response to a request, the scheduler unit reserves a number of mini-slots for use in the slot configuration period wherein a reserved slot number is responsive to at least one condition of a set of conditions comprising a condition of the AC power outage, and a condition of the reduced channel traffic based on the data received by the DU/CU about the at least one condition.

2. The system of claim 1, further comprising:
    the scheduler unit configured to initialize a set of mini-slots for use when scheduling the UE by mini-slot assignments to dynamically inform the UE about a UL transmit pattern and a DL transmit receive pattern for a mini-slot configuration period wherein the set of mini-slots is enabled in response to the data about an occurrence of the AC power outage, or the data about an occurrence of the reduced channel traffic at mini-slots from the DU/CU monitoring of the data at the plurality of cell sites in the network.

3. The system of claim 2,
    the scheduler unit to implement a time-domain based schedule to reduce power consumption in a UL transmission and a DL transmission by reductions in slot time via changing a frequency of the mini-slot configuration period by applying a set of time-domain scheduling periods wherein the number of mini-slots are enabled in a time-domain scheduling period.

4. The system of claim 3, further comprising:
    the scheduler unit configured to use a set of orthogonal frequency-division multiplexing (OFDM) symbols to enable a dynamic control of the number of mini-slots to send and receive data requests in the time-domain scheduling period.

5. The system of claim 4, further comprising:
    the scheduler unit to allocate the set of OFDM symbols to enable and disable one or more of the number of mini-slots in the mini-slot configuration period to deliver channel traffic, when a mini-slot allocation over a large bandwidth is deemed by the scheduler unit as unnecessary due to resulting decreases in amounts of data transmitted.

6. The system of claim 5, wherein a mini-slot length for the mini-slot configuration period of a set of UL and DL transmissions comprises 2, 4, and 8 OFDM symbols.

7. The system of claim 6, further comprising:
    the scheduler unit configured to support low latency and reduced power consumption for the UL transmission and the DL transmission in the mini-slot configuration period by enabling the UL transmission and the DL transmission over variable periods for the set of mini-slots based on a set of frequencies wherein a mini-slot is a fraction of a slot.

8. The system of claim 7, further comprising:
    in response to the low latency and reduced power consumption for the DL transmission, the scheduler unit is configured to not enable mini-slots to receive the DL transmission outside an active bandwidth part.

9. The system of claim 8, further comprising:
    in response to ongoing slot transmissions of the UE, the scheduling unit is configured to preempt an already ongoing slot-based transmission for other UEs operating in the plurality of cell sites in the network to enable immediate transmission of data at the low latency to decrease amounts of overall AC power drawn by the plurality of cell sites in the network.

10. The system of claim 9, further comprising:
    in response to a low latency and reduced power consumption for the UL transmission, the scheduler unit is configured to not enable mini-slots to receive the DL transmission that is outside an active bandwidth part.

11. A method for adaptive mini-slot management, comprising:
configuring an element management control unit comprising a set of distribution (DU) and central units (DU/CU) for monitoring data of an AC power outage and data of reduced channel traffic at a plurality of cell sites in a network;
configuring by a scheduler unit to enable and disable a set of mini-slots in a downlink (DL) pattern and an uplink (UL) pattern for adaptive mini-slot allocation comprising at least two concatenated patterns jointly repeated with periodicity for new radio (NR) communications by users at cell sites in the network; and
in response to a request, reserving by the scheduler unit a number of mini-slots for use in the slot configuration period wherein a reserved slot number is responsive to at least one condition of a set of conditions comprising a condition of the AC power outage, and a condition of the reduced channel traffic based on the data received by the DU/CU about the at least one condition.

12. The method of claim 11, further comprising:
initializing by the scheduler unit a set of mini-slots for use when scheduling for a User Equipment (UE) by mini-slot assignments to dynamically inform the UE about a UL transmit pattern and a DL transmit receive pattern for a mini-slot configuration period, wherein the set of mini-slots are enabled in response to the data about an occurrence of the AC power outage, or the data about an occurrence of the reduced channel traffic at mini-slots from the DU/CU monitoring of the data at the plurality of cell sites in the network.

13. The method of claim 12, further comprising:
implementing, by the scheduler unit, time-domain scheduling to reduce power consumption in a UL transmission and a DL transmission by reducing mini-slot time via changing a frequency of the mini-slot configuration period by applying a set of time-domain scheduling periods wherein the number of mini-slots is enabled in a time-domain scheduling period.

14. The method of claim 13, further comprising:
using, by the scheduler unit, a set of Orthogonal frequency-division multiplexing (OFDM) symbols for enabling dynamic control of the number of mini-slots for sending and receiving data requests in the time-domain scheduling period.

15. The method of claim 14, further comprising:
allocating, by the scheduler unit, one or more OFDM symbols from the set of OFDM symbols for enabling and disabling one or more mini-slots in the mini-slot configuration period for delivery of channel traffic based on bandwidth required and mini-slot activity.

16. The method of claim 15, wherein a mini-slot length for the mini-slot configuration period of a set of UL and DL transmissions comprises 2, 4, and 8 OFDM symbols.

17. The method of claim 16, further comprising:
supporting, by the scheduler unit, a low latency and reduced power consumption for the UL transmission and the DL transmission in the mini-slot configuration period by enabling the UL transmission and the DL transmission over variable periods for one or more mini-slots of the set of mini-slot based on a set of frequencies.

18. The method of claim 17, further comprising:
in response to the low latency and reduced power consumption for the DL transmission, preventing by the scheduler unit enabling of the one or more mini-slots of the set of mini-slot to receive the DL transmission outside an active bandwidth part.

19. The method of claim 18, further comprising:
in response to ongoing slot transmissions of the UE, preempting by the scheduler unit, already ongoing slot-based transmission for other UEs operating in the plurality of cell sites in the network to enable immediate transmission of data at low latency to decrease amounts of overall AC power drawn by the plurality of cell sites in the network.

20. A computer program product tangibly embodied in a computer-readable storage device that stores a set of instructions that when executed by a processor perform a method for an operational mode of a base station when a power loss or light network load is detected, the method comprising:
configuring an element management control unit comprising a set of distribution (DU) and central units (DU/CU) for monitoring data of an AC power outage and data of reduced channel traffic at a plurality of cell sites in a network;
configuring by a scheduler unit to enable and disable a set of mini-slots in a downlink (DL) pattern and an uplink (UL) pattern for adaptive mini-slot allocation comprising at least two concatenated patterns jointly repeated with periodicity for new radio (NR) communications by users at cell sites in the network; and
in response to a request, reserving by the scheduler unit a number of mini-slots for use in the slot configuration period wherein a reserved slot number is responsive to at least one condition of a set of conditions comprising a condition of the AC power outage, and a condition of the reduced channel traffic based on the data received by the DU/CU about the at least one condition.

* * * * *